United States Patent
Backes et al.

(10) Patent No.: US 10,034,333 B2
(45) Date of Patent: Jul. 24, 2018

(54) METHOD FOR OPERATING AN ARC FURNACE AND SMELTING SYSTEM HAVING AN ARC FURNACE OPERATED ACCORDING TO THE METHOD

(71) Applicant: SIEMENS AKTIENGESELLSCHAFT, München (DE)

(72) Inventors: Ralph-Herbert Backes, Erlangen (DE); Arno Döbbeler, Herzogenaurach (DE)

(73) Assignee: PRIMETALS TECHNOLOGIES GERMANY GMBH, Erlangen (DE)

( * ) Notice: Subject to any disclaimer, the term of this patent is extended or adjusted under 35 U.S.C. 154(b) by 804 days.

(21) Appl. No.: 14/391,634

(22) PCT Filed: Mar. 21, 2013

(86) PCT No.: PCT/EP2013/055951
§ 371 (c)(1),
(2) Date: Oct. 9, 2014

(87) PCT Pub. No.: WO2013/152937
PCT Pub. Date: Oct. 17, 2013

(65) Prior Publication Data
US 2015/0049780 A1     Feb. 19, 2015

(30) Foreign Application Priority Data

Apr. 11, 2012   (EP) .................................... 12163722

(51) Int. Cl.
*H05B 7/148*     (2006.01)
*H05B 7/144*     (2006.01)
(Continued)

(52) U.S. Cl.
CPC ............ *H05B 7/148* (2013.01); *C21C 5/5211* (2013.01); *C21C 5/5229* (2013.01); *F27B 3/085* (2013.01);
(Continued)

(58) Field of Classification Search
CPC ... C21C 5/5211; C21C 5/5229; C21C 5/5294; C21C 2005/5288; H05B 7/005;
(Continued)

(56) References Cited

U.S. PATENT DOCUMENTS 5,533,044 A * 7/1996 Strebel .................... H05B 7/156
373/104
5,987,052 A * 11/1999 Della Vedova ........ H05B 7/148
373/102
(Continued)

FOREIGN PATENT DOCUMENTS

| CN | 1244333 | 3/2006 |
|---|---|---|
| CN | 101228406 | 7/2008 |

(Continued)

OTHER PUBLICATIONS

Office Action dated Feb. 1, 2017 in corresponding Russian Patent Application No. 2014145218 (with German Translation).
(Continued)

*Primary Examiner* — Hung D Nguyen
(74) *Attorney, Agent, or Firm* — Staas & Halsey LLP

(57) ABSTRACT

At least one measurement value of a measurement variable characterizing the operating state of each of a plurality of system components that influence the operating conditions of an arc furnace is detected and compared to a respective currently permissible threshold value for the measurement variable. A maximum power that can be supplied to the arc
(Continued)

furnace within a time window while satisfying all currently permissible threshold values is determined based on the result of the comparison.

20 Claims, 2 Drawing Sheets

(51) Int. Cl.
| | |
|---|---|
| *C21C 5/52* | (2006.01) |
| *F27B 3/28* | (2006.01) |
| *F27B 3/08* | (2006.01) |
| *F27D 11/10* | (2006.01) |
| *F27B 14/06* | (2006.01) |
| *F27D 19/00* | (2006.01) |
| *F27B 14/00* | (2006.01) |

(52) U.S. Cl.
CPC ............... *F27B 3/28* (2013.01); *F27B 14/06* (2013.01); *F27D 11/10* (2013.01); *C21C 2005/5288* (2013.01); *C21C 2300/06* (2013.01); *F27B 2014/002* (2013.01); *F27D 2019/0037* (2013.01); *F27D 2019/0087* (2013.01); *Y02P 10/216* (2015.11); *Y02P 10/256* (2015.11); *Y02P 10/259* (2015.11); *Y02P 10/286* (2015.11)

(58) Field of Classification Search
CPC ........ H05B 7/144; H05B 7/148; H05B 7/156; F27B 3/085; F27B 3/24; F27B 3/28; F27B 14/06; F27B 2014/002; F27D 11/10; F27D 2019/0037; F27D 2019/0087; Y02P 10/216; Y02P 10/256; Y02P 10/259; Y02P 10/286

USPC .................................. 373/102, 104, 105, 108
See application file for complete search history.

(56) References Cited

U.S. PATENT DOCUMENTS

| | | |
|---|---|---|
| 6,104,744 A | 8/2000 | Poppe et al. |
| 2009/0238234 A1 | 9/2009 | Schubert et al. |
| 2012/0183010 A1 | 7/2012 | Dittmer et al. |

FOREIGN PATENT DOCUMENTS

| | | |
|---|---|---|
| DE | 197 11 453 A1 | 9/1998 |
| DE | 102007041632 A1 | 4/2008 |
| DE | 102009031355 A1 | 10/2011 |
| EP | 0 895 441 A1 | 2/1999 |
| EP | 12163722 | 4/2012 |
| JP | 8-273826 | 10/1996 |
| RU | 2 014 762 C1 | 6/1994 |
| RU | 2 268 556 C1 | 1/2006 |
| WO | 2011/036071 A1 | 3/2011 |

OTHER PUBLICATIONS

Office Action dated Jun. 16, 2015 in corresponding Chinese Patent Application No. 201380019369.0.
International Search Report for PCT/EP2013/055951 dated Aug. 22, 2013.
EP Search Report for Application No. 12163722.7 dated Sep. 19, 2012.
Jansen, et al.; "Schallbasierte Schaumschlacken-Detektion zur Leistungsregelung Eines Elektrolichtbogenofens"; Sep. 2010; vol. 130, No. 9, pp. 53, 54, 56-58, 61, 62.

* cited by examiner

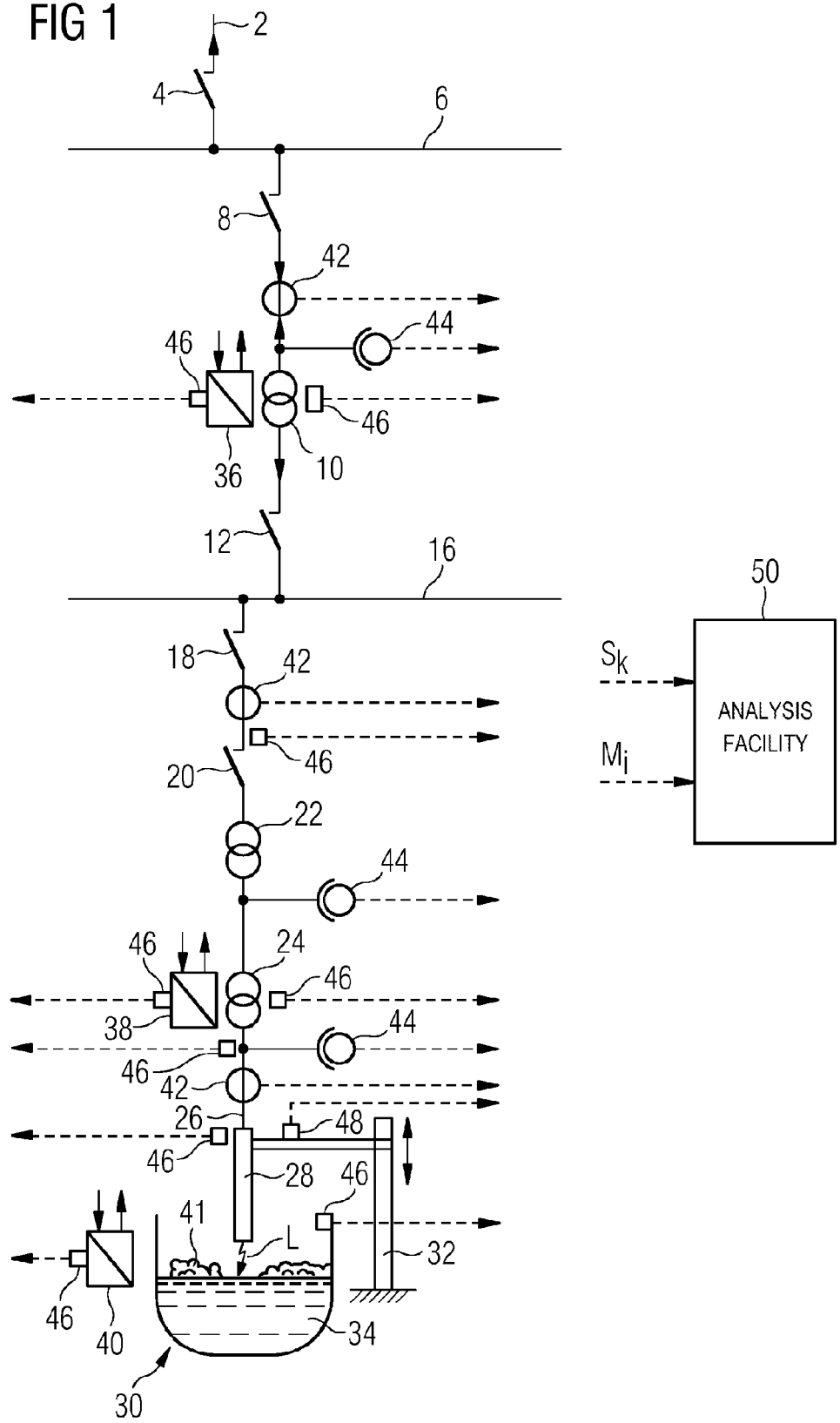

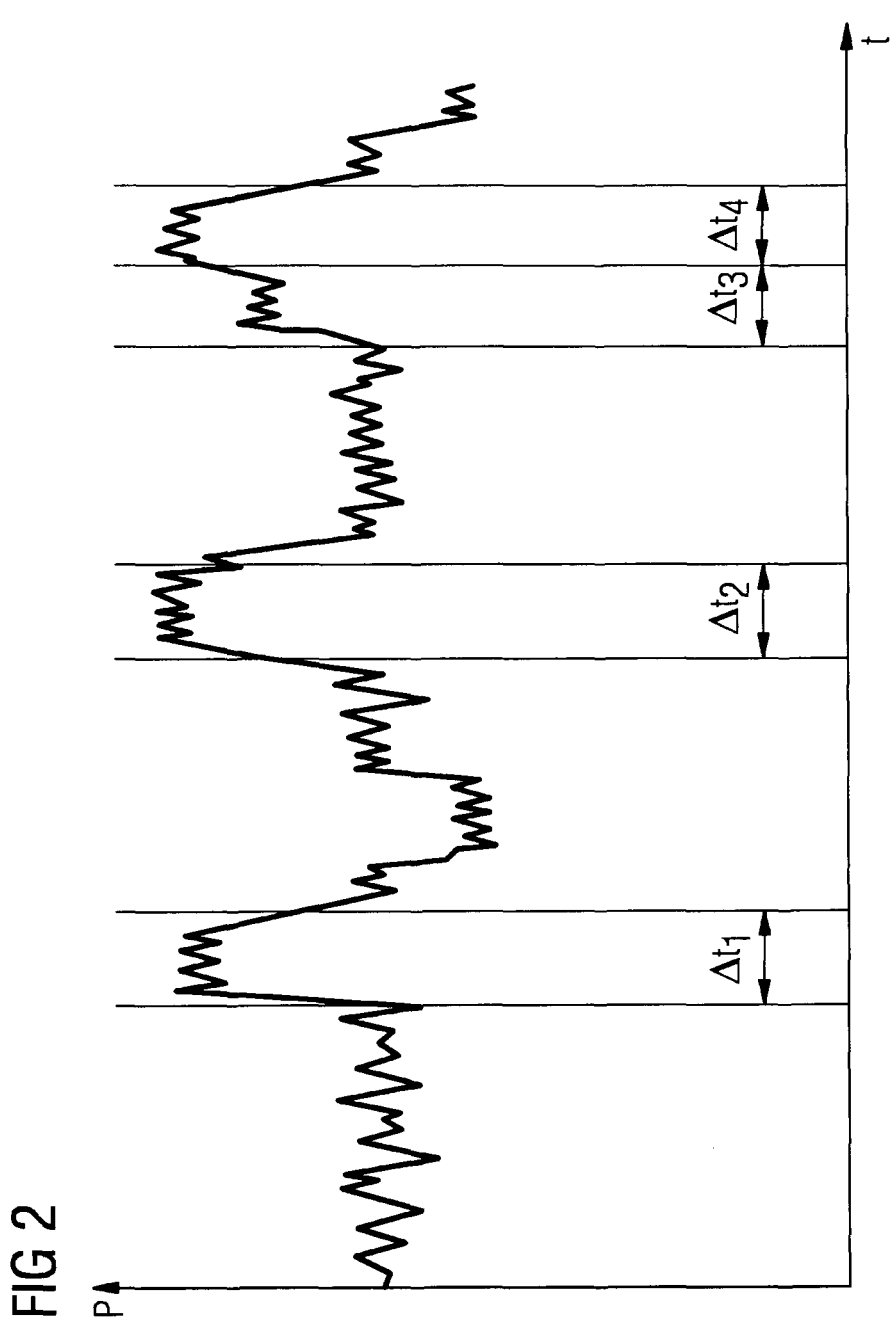

METHOD FOR OPERATING AN ARC FURNACE AND SMELTING SYSTEM HAVING AN ARC FURNACE OPERATED ACCORDING TO THE METHOD

CROSS REFERENCE TO RELATED APPLICATIONS

This application is the U.S. national stage of International Application No. PCT/EP2013/055951, filed Mar. 21, 2013 and claims the benefit thereof. The International Application claims the benefit of European Application No. 12163722 filed on Apr. 11, 2012, both applications are incorporated by reference herein in their entirety.

BACKGROUND

Described below are a method for operating an electric arc furnace and a smelting plant with an electric arc furnace operated in accordance with this method.

In an electric arc furnace, pieces of material to be smelted, in general steel scrap, if necessary together with further supplementary materials, are melted down by an electric arc which is struck between the material to be smelted and at least one electrode. For this purpose, electrical energy, which is converted into the low voltage range by a so-called furnace transformer, is fed to the electric arc furnace from a medium- or high-voltage supply. From this furnace transformer, the energy is fed to the electrode via a high current system. The scrap metal present in the furnace vessel is melted down by an electric arc which then burns at the tip of the electrode.

The plant components which relate to the supply of electrical energy for the electric arc furnace include a so-called furnace substation, a furnace transformer and a high current system which, for example, incorporates current-conducting height-adjustable supporting arms, to which are attached the electrodes. The height setting of the electrodes, and thereby the energy input into the goods to be smelted, is regulated by an electrode regulation system. This produces a wide selection of working points, or operating conditions, which can differ substantially in terms of the performance demands on the plant components.

The design and selection of the plant components is generally effected on the basis of values from experience for the electric arc furnace concerned. Thus, for example, the design of the furnace transformer is determined as a function of the size of the electric arc furnace, the nature of the steel scrap and the desired productivity, i.e. the smelting capacity (mass of the steel scrap to be melted down per unit time), which determines the required smelting time of the electric arc furnace. In doing this, apart from determining the complex power in the range up to about 300 MVA, the number of stages and the voltages of the stages in the furnace transformer, for example eighteen stages with voltages of up to about 1500 V, and the currents, which can be up to about 100 kA, are defined.

However, in order to reliably avoid damage to those plant components which affect the operating conditions of the electric arc furnace, in particular the furnace transformer, the potential power which is actually available, at least for short periods, is not utilized to the full extent possible, and correspondingly allowance is made for a reduced productivity.

SUMMARY

Described below are a method for the operation of an electric arc furnace with which it is possible to increase the productivity of an electric arc furnace and a smelting plant with an electric arc furnace operated in accordance with this method.

For each of a plurality of the plant components which influence the operating conditions of the electric arc furnace, at least one measured value is sensed for a measurement variable which characterizes its operating status, and is compared with a currently permissible limiting value for the measurement variable concerned, and by reference to the result of this comparison a time window is determined, and a maximum power which may be fed to the electric arc furnace within this time window while adhering to all the currently permissible limiting values.

These measures make it possible to operate an electric arc furnace so as to exploit its optimal productivity, because a loading range which is currently available can be utilized in order to have more power available for melting down, at least for a short period, i.e. within a time window which is shorter than the smelting time (time between the first charging of the electric arc furnace and the tapping off of the melt), or to compensate for unplanned production losses, without for example damaging the furnace transformer.

The time window is determined automatically, making use of values from experience, where the length of the time window and the maximum power which can be fed in are generally dependent on each other, thus opening up for the operator the option of operating the electric arc furnace with a low maximum power and long time window or a high maximum power and a short time window. As an alternative to this, the duration of the time window can also be undefined, its end being determined by operating the electric arc furnace at the power which has been determined as the maximum when a currently permissible limiting value for a measurement variable at one of the plant components is reached.

Because the plant components can be optimally exploited, in respect of their limiting values, for the purpose of achieving a prescribed productivity, the plant components in new plants can be designed so that they are optimized for the requirements, thus avoiding the cost of overdimensioning them.

Here, the currently permissible limiting value can be either a predefined fixed and unalterable value, for example the voltage endurance of an electrical component of the plant, or a value which varies with time, dependent on the current operating conditions of the electric arc furnace, as sensed by the measured values. An example of such a variable value could be the maximum power of the furnace transformer which, within a time window, can exceed a predefined basic value by a maximum possible predetermined value provided that another currently permissible limiting value, for example a temperature measured at the furnace transformer, is not exceeded.

A particularly safe determination of the maximum available load range is achieved if the maximum power which can be fed in and/or the length of the time window is determined with the assistance of a prediction of the course over time of at least one of the measurement variables. This ensures that the plant component is not overloaded within the time window, so that a failure arising from an overload is avoided.

The measurement variables which are sensed may be an electric current flowing through the plant component, an electrical voltage across the plant component and/or a temperature of the plant component.

In a further embodiment, a piece of auxiliary equipment which indirectly influences the operating status of a plant component, such as in particular cooling equipment through which a cooling fluid flows, is controlled in that the input temperature and/or the throughput of the cooling fluid is regulated to maintain for the plant component a temperature, either currently defined or permanently prescribed as a limiting value.

In a further embodiment of the method, the limiting value is a temperature of the plant component, wherein foaming slag is used as thermal screening to protect the plant components against the radiation from the electric arc.

BRIEF DESCRIPTION OF THE DRAWINGS

The properties, characteristics and advantages described above, and the manner in which these are achieved, will become more clearly and more obviously comprehensible in conjunction with the following description of the exemplary embodiments, which are explained in more detail in conjunction with the accompanying drawings of which FIG. 1 is a schematic block diagram of a smelting plant with an electric arc furnace, FIG. 2 is a graph in which the power fed to the smelter is plotted against time.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

As shown in FIG. 1, the electrical energy required for operation of the smelting plant is fed in from a cable or an overhead line 2 through a high voltage supply switch 4 to a high voltage busbar 6. The high voltage across the high voltage busbar 6 is fed via a high voltage output switch 8 to a step-down transformer 10, which transforms the high voltage to a medium voltage. The secondary side of the step-down transformer 10 is connected electrically via a medium voltage supply switch 12 to a medium voltage busbar 16. The voltage across the medium voltage busbar 16 is fed via an output switch 18, a furnace switch 20 and via a pre-furnace choke 22 to the primary side of a furnace transformer 24, the secondary side of which is connected via a high current catenary 26 to an electrode 28 of an electric arc furnace 30. The electrode 28 is arranged on a supporting column 32 so that its height can be adjusted, to enable the length of the arc which is burning between the electrode 28 and the goods to be smelted 34, and correspondingly the energy input into the electric arc furnace 30, to be adjusted.

The plant components shown in FIG. 1, which are involved in the electrical supply to the electrode 28, here represent only a selection by way of example, and do not include all the plant components actually present in practice.

Apart from the electrical components of the plant, the smelting plant includes also non-electrical plant components, which are again illustrated in FIG. 1 by way of example and not exhaustively, by cooling equipment 36, 38 and 40, which effect cooling respectively of the step down transformer 10, of the furnace transformer 24 or of wall panels of the electric arc furnace 30.

FIG. 1 also illustrates foaming slag 41, with which the thermal radiation from the arc L can if necessary be screened off, in order to reduce the thermal load on the components located in the immediate vicinity of the arc L.

Both on the primary side of the step down transformer 10 and also on the primary and secondary sides of the furnace transformer 24, measurement equipment 42 and 44 is provided for the purpose of measuring the current or the voltage, as appropriate.

Other measurement equipment which is illustrated is temperature measurement equipment 46, with which the temperature at different thermally loaded places in the smelting plant can be measured directly as measurement variables, or can be determined indirectly on the basis of a thermal model. By way of example, but not an exhaustive list, such temperature measurement equipment 46 is shown on the step down transformer 10, on the supply cabling system, on the primary and secondary sides of the furnace transformer 24, and on the wall of the furnace vessel and on the electrode 28.

Over and above this, the input and exit temperatures of the coolant flowing through the cooling equipment, 36, 38 and 40, are also sensed, together with its throughput.

In principle, measurement equipment 48 can also be provided with which mechanical measurement variables, for example vibrations of the supporting arm on the supporting column 32, are sensed.

The measured values, $M_i$, i=1 to n, which are sensed by the measurement equipment 42, 44, 46, 48 for the relevant electrical, thermal or mechanical measurement variables, as applicable, are fed—as shown symbolically by the dashed arrows which have been drawn in—to a control and analysis facility 50. In the control and analysis facility 50, the relevant permissible limiting values for the measurement variables in the plant components which are being monitored are held in the form of a look-up table or a dynamic model. These permissible limiting values can be permanently predefined for certain plant components, but can in addition also be dependent on the measured values of other measurement variables, in particular on the same plant component. Thus, for example, the permissible limiting value for the power transmitted by the furnace transformer 24 can be a function of its temperature, and can reduce with increasing temperature. The temperature of the furnace transformer 24 can in turn be influenced by the input temperature and the throughput of the coolant through the cooling equipment 38. In addition, this permissible limiting value can also be further dependent on the length of the time window within which the working point is to be adjusted to this limiting value. Thus, for example, the shorter is the time window, the higher is the permissible limiting value for a measured temperature.

By comparing the measured values which have been measured against the limiting values which have been determined as currently permissible, if necessary taking into consideration the measured values themselves, a time window and the maximum power which can be fed to the electric arc furnace 30 within this time window are now determined. These are, for example, displayed in the control center to a user, who is thus in a position to increase the productivity, if necessary, while the analysis and control facility 50 will in addition block any breach of this maximum power even if manual control is being exercised. As an alternative to this, an automated way of running can be provided by which, within the time window which has been determined, the electric arc furnace 30 is automatically operated with the maximum power which can be fed in.

Here, it is important for operational safety that the currently permissible limiting values are not exceeded for any of the plant components. If, for example, the operation of the smelting plant at the maximum power which can be fed to it leads to the currently permissible limiting value being reached for one plant component, the control facility 50 automatically generates for the smelting plant control signals $S_k$, k=1 to m which have the result that this limiting value is not exceeded. For example, if the thermal load on the electrode 28 reaches a currently applicable limiting value even though the furnace transformer is being operated with a power which does not exceed the permissible limiting value which applies for the measured temperature and the time window which is set, then either this power is reduced in order to prevent the currently permissible limiting value for the temperature of the electrode 28 being exceeded or, for example, measures are initiated which effect a more efficient cooling of the electrode 28.

FIG. 2 shows, in a simplified diagram, one possible way of running when the electric arc furnace is in operation. In this diagram, the power P which is fed in is plotted against the time t. From the diagram it will be seen that, within several short time windows $\Delta t_1$, $\Delta t_2$, $\Delta t_3$, $\Delta t_4$, the durations of which are shorter than the smelting time, the power P fed to the electric arc furnace is significantly above a basic power $P_0$ which would be possible for continuous operation. In these time windows $\Delta t_i$, the currently available limiting values are determined by reference to the current operating conditions, i.e. the measured values currently sensed by the measurement equipment, from which are deduced the implied maximum possible powers within these time windows $\Delta t_i$. Here, these time windows $\Delta t_i$ are either determined and appropriately prescribed by the analysis and control facility, on the basis of the current operating state and/or an expected course of the changes in this operating state, or are defined by an abort criterion, for example the reaching of a currently permissible limiting value.

Although the details of the invention have been illustrated and described in more detail by the exemplary embodiments, the examples disclosed do not thereby restrict the invention, and other variations can be deduced from it by a person skilled in the art without going outside the scope of protection of the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for operating an electric arc furnace, comprising:
   determining a time window shorter than a smelting time;
   detecting at least one measured value of a measurement variable which characterizes an operating state, for each of a plurality of different plant components which influence operating conditions of the electric arc furnace;
   comparing the at least one measured value with a currently permissible limiting value for each measurement variable to obtain comparison results;
   determining, by reference to the comparison results, a maximum power which can be fed to the electric arc furnace within the time window while adhering to each currently permissible limiting value; and
   operating the electric arc furnace during the time window by supplying no more than the maximum power that was determined.

2. The method as claimed in claim 1, wherein said operating operates the electric arc furnace automatically during the time window with the maximum power that was determined.

3. The method as claimed in claim 2, wherein at least one of said determining the maximum power which can be fed in and said determining the time window is based on a prediction of a course over time of at least one of the measurement variables.

4. The method as claimed in claim 3, wherein said detecting detects, as the measurement variable, at least one of an electric current flowing through, an electric voltage across and a current temperature of one of the different plant components.

5. The method as claimed in claim 4, further comprising controlling an auxiliary device, which indirectly influences the operating state of at least one of the different plant components.

6. The method as claimed in claim 5,
   wherein the limiting value is a maximum temperature of the one of the different plant components,
   wherein the auxiliary device is cooling equipment through which a cooling fluid flows, and
   wherein said operating controls at least one of an input temperature and a throughput of the cooling fluid in maintaining the current temperature of the one of the different plant components.

7. The method as claimed in claim 5, wherein foaming slag acts as thermal screening to protect the one of the different plant components from radiation emitted by the electric arc furnace.

8. The method as claimed in claim 1, wherein at least one of said determining the maximum power which can be fed in and said determining the time window is based on a prediction of a course over time of at least one of the measurement variables.

9. The method as claimed in claim 1, wherein said detecting detects, as the measurement variable, at least one of an electric current flowing through, an electric voltage across and a current temperature of one of the different plant components.

10. The method as claimed in claim 1, wherein said controlling includes controlling an auxiliary device, which indirectly influences the operating state of at least one of the different plant components.

11. The method as claimed in claim 10,
    wherein the limiting value is a maximum temperature of the at least one of the different plant components,
    wherein the auxiliary device is cooling equipment through which a cooling fluid flows, and
    wherein said controlling controls at least one of an input temperature and a throughput of the cooling fluid in maintaining the current temperature of the at least one of the different plant components.

12. The method as claimed in claim 10, wherein foaming slag acts as thermal screening to protect the at least one of the different plant components from radiation emitted by the electric arc furnace.

13. The method as claimed in claim 1, wherein the different plant components include at least one electrode and at least one of a furnace substation, a furnace transformer, an electrode regulation system, a cooling system and a high current system, including current-conducting height-adjustable supporting arms.

14. A smelting plant with an electric arc furnace, comprising:
    a plurality of measurement equipment sensing measured values of measurement variables characterizing operating states of different plant components which influence operating conditions of the electric arc furnace; and at least one programmed processor in a control and analysis facility evaluating the measured values and controlling the electric arc furnace by determining a time window shorter than a smelting time;

comparing each of the measured values with a currently permissible limiting value for each measurement variable to obtain comparison results, and determining, by reference to the comparison results, a maximum power which can be fed to the electric arc furnace within the time window while adhering to each currently permissible limiting value.

15. The smelting plant as claimed in claim 14, wherein said at least one programmed processor determines at least one of the maximum power which can be fed in and a length of the time window based on a prediction of a course over time of at least one of the measurement variables.

16. The smelting plant as claimed in claim 14, wherein said measurement equipment detects, as at least one of the measurement variables, at least one of an electric current flowing through, an electric voltage across, and a current temperature of one of the different plant components.

17. The smelting plant as claimed in claim 14,
wherein said smelting plant further includes an auxiliary device which indirectly influences the operating state of at least one of the different plant components, and
wherein said at least one programmed processor further controls the auxiliary device.

18. The smelting plant as claimed in claim 17,
wherein the limiting value is a maximum temperature of the at least one of the different plant components,
wherein the auxiliary device is cooling equipment through which a cooling fluid flows, and
wherein said at least one programmed processor controls at least one of an input temperature and a throughput of the cooling fluid in maintaining the current temperature of the at least one of the different plant components.

19. The smelting plant as claimed in claim 17, wherein foaming slag acts as thermal screening to protect the at least one of the plant components from radiation emitted by the electric arc furnace.

20. The smelting plant as claimed in claim 14, wherein the different plant components include at least one electrode and at least one of a furnace substation, a furnace transformer, an electrode regulation system, a cooling system and a high current system, including current-conducting height-adjustable supporting arms.

* * * * *